United States Patent
Weiland et al.

[11] Patent Number: 5,285,551
[45] Date of Patent: Feb. 15, 1994

[54] ASSIST STRAP

[75] Inventors: Walter M. Weiland; Jay M. Frankhouse, both of Holland, Mich.

[73] Assignee: Prince Corporation, Holland, Mich.

[21] Appl. No.: 831,976

[22] Filed: Feb. 6, 1992

[51] Int. Cl.$^5$ .............................................. B60N 3/02
[52] U.S. Cl. .................... 16/125; 16/DIG. 24; 296/71; 411/520
[58] Field of Search ............. 16/110 R, 116 A, 116 R, 16/125, 126, DIG. 24, DIG. 25, DIG. 28; 5/466; 297/183; 190/115, 116; 49/460; 296/71; 411/520, 522, 523, 524

[56] References Cited

U.S. PATENT DOCUMENTS

| | | | |
|---|---|---|---|
| 773,835 | 11/1904 | White | 16/DIG. 28 |
| 1,454,253 | 5/1923 | Rissman | 16/DIG. 28 |
| 2,105,580 | 1/1938 | Bechik | 16/DIG. 28 |
| 2,114,542 | 4/1938 | Rydquist | 16/DIG. 28 |
| 2,144,910 | 1/1939 | Churchill | 411/520 |
| 2,244,977 | 6/1941 | Hansman et al. | 411/524 |
| 2,327,328 | 8/1943 | Murphy | 411/520 |
| 2,845,155 | 7/1958 | Kynnersley . | |
| 2,903,939 | 9/1959 | Meyer | 411/524 |
| 3,182,367 | 5/1965 | Hamann et al. | 16/125 |
| 3,736,621 | 6/1973 | Szabo | 16/125 |
| 3,952,383 | 4/1976 | Moore et al. . | |
| 3,977,054 | 8/1976 | Moore et al. | 16/110 R |
| 4,016,315 | 4/1977 | Szabo | 16/116 R |
| 4,064,594 | 12/1977 | Teti et al. | 16/125 |
| 4,067,602 | 1/1978 | Ahlisch et al. | 296/71 |
| 4,174,988 | 11/1979 | Moore et al. . | |
| 4,356,592 | 11/1982 | Moore | 16/125 |
| 4,357,734 | 11/1982 | Moore | 16/125 |
| 4,373,229 | 2/1983 | Moore | 16/125 |
| 4,409,163 | 10/1983 | Van Manen | 264/45.5 |
| 4,525,231 | 6/1985 | Wnuk | 156/185 |
| 4,547,954 | 10/1985 | Van Manen | 29/458 |
| 4,556,245 | 12/1985 | Gruenwald | 16/110 R |
| 4,686,741 | 8/1987 | Moore et al. | 16/112 |
| 4,696,077 | 9/1987 | Kim | 16/125 |
| 4,754,858 | 7/1988 | Robinson | 16/116 A |
| 4,794,668 | 1/1989 | Lorence et al. | 16/125 |
| 4,971,645 | 11/1990 | Licus . | |

FOREIGN PATENT DOCUMENTS

| | | | |
|---|---|---|---|
| 2229661 | 1/1973 | Fed. Rep. of Germany | 16/125 |
| 1562374 | 2/1969 | France | 16/110 R |
| 2-88335 | 3/1990 | Japan | 16/116 R |
| 182199 | 1/1196 | Sweden | 16/125 |
| 216172 | 10/1967 | Sweden . | |
| 635025 | 3/1950 | United Kingdom | 16/125 |
| 814482 | 6/1959 | United Kingdom | 296/71 |
| 1174605 | 12/1969 | United Kingdom . | |

Primary Examiner—Lowell A. Larson
Assistant Examiner—Donald M. Gurley
Attorney, Agent, or Firm—Price, Heneveld, Cooper, DeWitt & Litton

[57] ABSTRACT

An assist strap is made of a flexible exoskeleton of a tubular shape which overlies a high density foam core to provide a strong yet cushioned strap. Opposite ends of the strap are held by clamps which in turn are secured to a vehicle for attaching the strap to a vehicle.

24 Claims, 2 Drawing Sheets

ASSIST STRAP

BACKGROUND OF THE INVENTION

The present invention pertains to an assist strap for use in a vehicle such as an automobile.

Assist straps, or grab handles are in common use in vehicles and frequently are mounted to the vehicle roof above a door for assistance in ingress and egress from the vehicle. Assist straps are also frequently mounted to vehicle doors for assistance in closing them. In the past, the construction of assist straps or handles have included a metal strap which has been cushioned and upholstered and anchored at opposite ends by suitable mounting brackets. Common to the assist strap art is the utilization of a central structural member, typically a flat metal band which is subsequently surrounded by padding material to provide a comfortable feel to the assist strap. Such construction, however, results in the relatively sharp edges of the flat strap being somewhat uncomfortable and, over a period of time, can lead to wearing of the assist strap due to the sharp edges of the band cutting into the covering material. Additionally, such construction typically requires multiple components and processing steps for the manufacture of the straps. The strap body alone includes a band, a foam cushion layer, and an outer decorative covering. This also increases the cost of such devices.

SUMMARY OF THE PRESENT INVENTION

The assist strap of the present invention overcomes the difficulties of the prior art by providing an assist strap with a flexible exoskeleton of a tubular shape which overlies a high density foam core to provide a strong yet cushioned strap. Opposite ends of the strap are held by clamping means in turn secured to a vehicle.

The resultant construction provides an integral two-section assist strap with a cushioned feel and sufficient strength and rigidity to withstand normal use in a vehicle. It provides an oval or other desired cross-sectional shape instead of the generally flat commonly used configuration. The resultant strap design is relatively inexpensive and provides improved performance over existing strap designs. These and other features, objects and advantages of the present invention will become apparent upon reading the following description thereof together with reference to the accompanying drawings in which:

DETAILED DESCRIPTION OF THE PREFERRED EMBODIMENT

Figure 1:
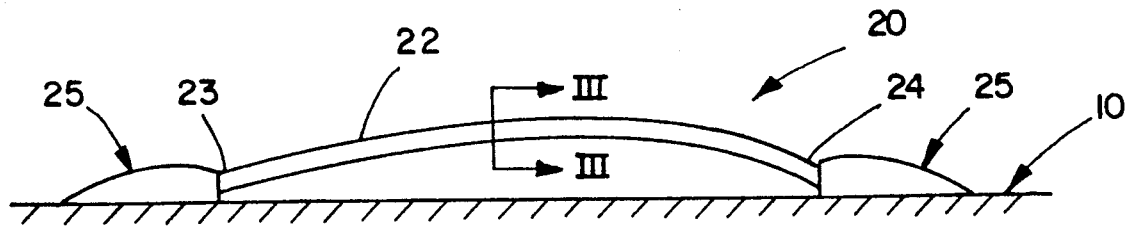
FIG. 1 is a side elevational view of an assist strap embodying the present invention and mounted within a vehicle.
Figure 2:
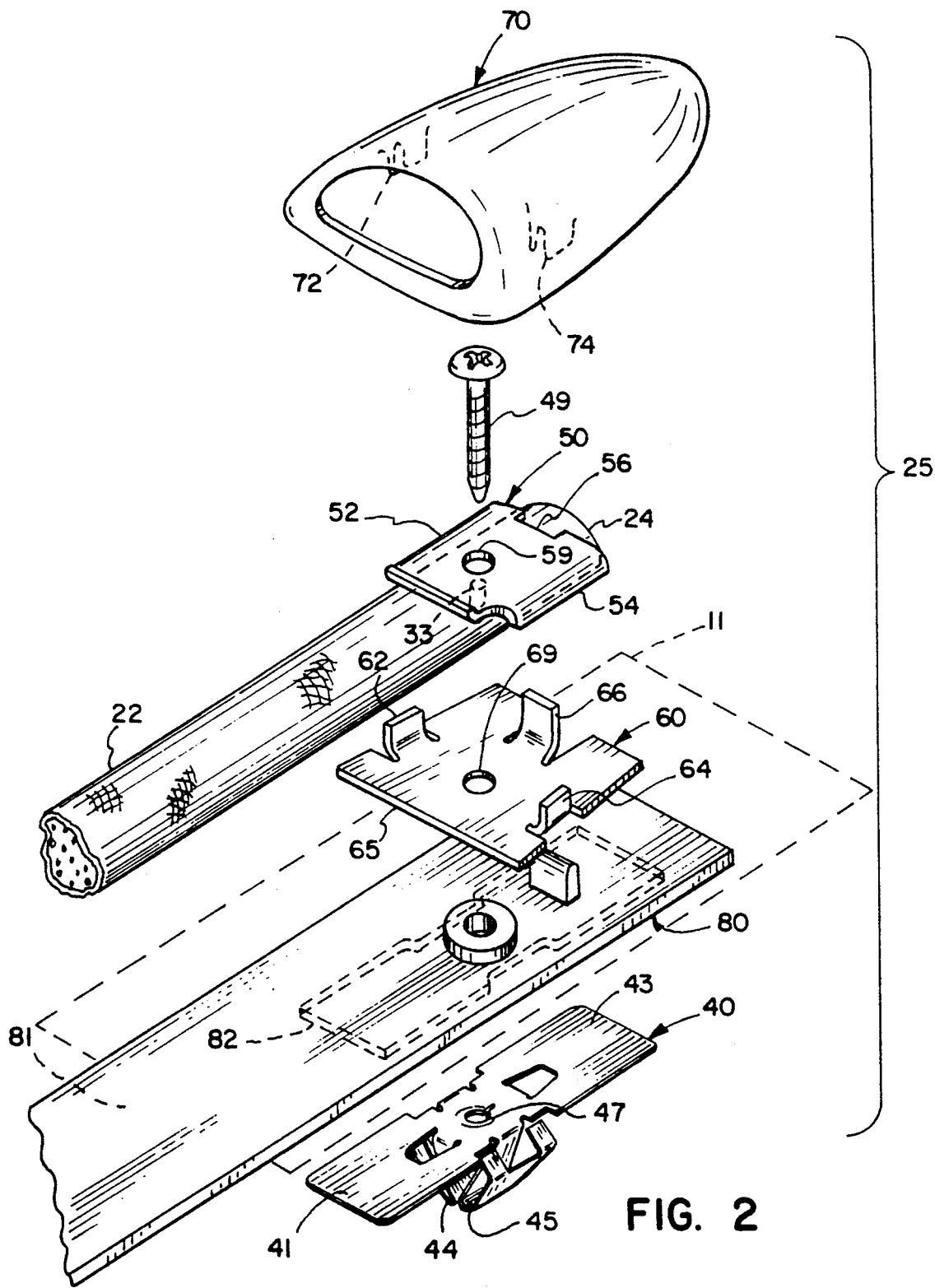
FIG. 2 is an enlarged fragmentary exploded view of one end of the assist strap of the present invention and its mounting means.

Referring initially to FIG. 1, there is shown schematically a support member 10 of a vehicle such as an automobile. The support member 10 may be a vehicle roof, a vehicle door panel, or other area of an interior of a vehicle to which one or more assist straps 20 embodying the present invention are installed. The assist strap 20 includes a composite strap member 22 coupled at opposite ends 23 and 24 to support member 10 by means of mounting assemblies 25 as best seen in FIG. 2. The mounting assemblies are covered by decorative caps 70 (FIG. 2) at each end of the strap 22 to provide a trim appearance to the installation. Turning now to the enlarged cross-sectional view of FIG. 3, there is shown the body of the unique strap construction 22 which comprises an exoskeleton 30 made of a 100% NYLON web woven in a tubular shape. In the preferred embodiment, the fabric was 840 denier although a range of from about 600 to 1000 is suitable. The tubular web 30 of material is generally circular before being filled with the oval core material 32. The diameter of the exoskeleton 30 is approximately 1" in the preferred embodiment, although different sized webs and cores can be provided. The exoskeleton webbing 30 is commercially available from Lea & Sachs, Inc., of Des Plaines, Ill.

Figure 3:
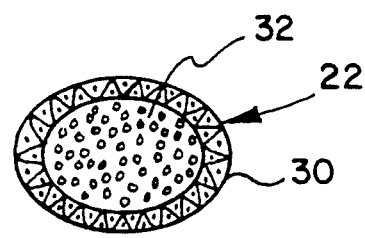
FIG. 3 is an enlarged cross-sectional view taken along section lines III—III of FIG. 1.

Completing the body of the assist strap 22 is a high density foam polymeric core material 32. In the preferred embodiment, ETHAFOAM polyethylene foam was employed and is commercially available from Dow Chemical as Model No. HS-600. This or other high density foam polymeric material which meets motor vehicle safety standards No. 302 for automotive applications can be employed. The generally circular i.e. oval foam core 32 is cut from blanks of such foam material using a hot wire cutting machine to form the oval cross-sectional configuration. The foam core 32 is then compressed slightly and, while slightly expanding a section of the webbing material 30, the foam material 32 is inserted into the webbing and allowed to expand to provide a snug interface between the structural foam core 32 and the exoskeleton 30 as seen in FIG. 3. The tips of the opposite ends 23 and 24 of the strap 22 thus formed are sealed by compression and a hot melt adhesive for terminating the free ends of the assist strap 22. As can be seen in FIG. 1, the length of the assist strap 22 exceeds the spacing between the mounting assemblies 25 such that the handle so formed is convexly curved with respect to the surface of mounting member 10 to provide access for the hand of the user. The rigid foam material maintains the grab handle in this shape upon installation. The mounting of each of the ends of the unique strap construction is disclosed in FIG. 2 which is now described.

Each of the identical mounting assemblies includes a spring mounting fastening clip 40, a lower compression clamp member 60, an upper compression clamp member 50, a fastener 49 and a cover 70. Optionally, as described below, a backing plate 80 may be interposed between spring mounting fastening clip 40 behind a vehicle panel 11 and under the lower clamp 60. Each end 23 and 24 of strap 22 is compressively held between members 50 and 60 and to clip 40 mounted to the vehicle by the fastener 49. The spring mounting clip 40 is commercially available and of generally conventional construction having a pair of outer top flanges 41 and 43 and spring-loaded legs 44 and 45 which are inserted into a rectangular aperture in the sheet metal support forming part of the support member 10 of the vehicle. Flanges 41 and 43 abut against the outer surface of the upholstery material covering the sheet metal structural member once the clip 40 has been installed. Clip 40 includes a threaded aperture 47 for receiving a Phillips head fastening screw 49 for installation of the grab handle.

Each end of grab handle 22 includes an aperture 33 which can be formed by the insertion of screw 49 therethrough or pre-punched as desired. End 24 is compressibly held between an upper clamping plate 50 and a lower clamping plate 60 to the structural support member 10 of the vehicle by the insertion of fastener 49 through aperture 59 in plate 50 and 69 in plate 60 and thence into the threaded aperture 47 of the spring clip 40. A decorative cover cap 70 can be molded of a suitable polymeric material and includes downwardly directed spaced flanges 72 and 74 for gripping upwardly extending posts 62 and 64 respectively of lower plate 60. The spring clip 40, upper and lower clamping plates 50 and 60, strap 22, and cap 70 can be preassembled and installed to a panel such as a headliner or door panel by the manufacturer and subsequently installed in the vehicle by press-fitting clips 40 into aligned apertures formed in the underlying support member 10 if desired. Having described the overall construction of the system, a somewhat more detailed description of the individual components of the mounting assembly shown in FIG. 2 is now presented.

The upper compressive member 50 includes downwardly curved opposite edges 52 and 54 which overlie the outer diameter of the generally tubular handle 22 tending to envelop the ends of the strap once in a compressed installed position. The outer edge of plate 50 includes a notch 56 for receiving an upwardly projecting tang 66 of plate 60 for indexing the two compression members against relative rotation. Member 50 thus is lockably aligned with member 60. The apertures 59 and 69 align with aperture 47 of clip 40. The distance between the upstanding tabs 62 and 64 accommodates edges 52 and 54 therebetween such that member 50 nests and is lockably held within member 60 upon the tightening of fastener 49. Fastener 49 is extended through aperture 59, through aperture 33 of strap 22, aperture 69, and is threaded into aperture 47 of spring mounting clip 40. The screw is tightened sufficiently so that the end of strap 22 becomes substantially flattened and a rigid interconnection between the end and plates 50 and 60 is achieved. The molded polymeric decorative cap 70 is then snapped over upwardly extending tabs 62 and 64 of plate 60 to cover the mounting plates 50, 60 and end of the strap. Each of the ends of the strap 22 are so terminated to provide a clean and yet functional assist handle as seen in FIG. 1. Members 50 and 60 can be stamped from steel parts suitably treated against rust in a conventional manner as is spring clip 40.

In embodiments of the invention where the assist strap is mounted to, for example, the headliner of a vehicle, a backing plate may be desirable. As seen in FIG. 2, in phantom form, a headliner 11 includes a backing plate 80 which can be positioned on the undersurface of the headliner and which includes a recess 82 formed therein for overlying and receiving clip 40. In this installation, the headliner is interposed between the upper surface 81 of backing plate 80 and the lower surface 65 of clamping plate 60. Fastening screw 49 compresses strap 22 between clamping members 50 and 60 and clamps headliner 11 between backing plate 80 and clamp 60 as well as attaches the entire assembly to the clip 40 which is subsequently inserted into a rectangular socket formed in the sheet metal roof of the vehicle.

It will become apparent to those skilled in the art that various modifications to the preferred embodiments of the invention described herein can be made but will fall within the spirit and scope of the invention as defined by the appended claims.

The embodiments of the invention in which an exclusive property or privilege is claimed are defined as follows:

1. An assist strap for use in a vehicle comprising:
   a tubular exoskeleton made of a flexible material;
   an insert for said tubular exoskeleton made of a cushioning material, said insert surrounded by said exoskeleton to form a strap including only said insert and said exoskeleton; and
   means for attaching opposite ends of said strap to a vehicle, said means including a pair of plates mounted on opposite sides of an end of said strap and including a fastener for drawing said plates together for compressing said strap therebetween, said means for attaching further including a snap-in clip positioned proximate one of said pair of plates, said fastener also engaging and retaining said snap-in clip to said end of said strap in a predetermined location prior to installation of said assist strap to the vehicle.

2. An assist strap as defined in claim 1 wherein said tubular exoskeleton is made of a woven fabric.

3. An assist strap as defined in claim 2 wherein said insert is a foam polymeric material.

4. An assist strap as defined in claim 3 wherein said woven fabric is NYLON.

5. An assist strap as defined in claim 4 wherein said woven fabric has a denier of from 600 to 1000.

6. An assist strap as defined in claim 5 wherein said foam polymeric material is a polyethylene foam.

7. An assist strap as defined in claim 6 wherein said insert has an oval cross-section.

8. An assist strap as defined in claim 7 wherein said fastener includes a fastening screw.

9. An assist strap as defined in claim 1 wherein said fastener includes a fastening screw.

10. An assist strap for use in a vehicle comprising:
    a tubular exoskeleton made of a flexible material, said flexible material being a nylon woven fabric having a denier of from 600 to 1000;
    an insert for said tubular exoskeleton made of a cushioning material, said cushioning material being a polyethylene foam and having an oval cross section, said insert being surrounded by said exoskeleton to form a strap including only said insert and said exoskeleton; and
    clamp means for attaching opposite ends of said strap to a vehicle, said clamp means including a pair of plates mounted on opposite sides of an end of said strap and including means for drawing said plates together for compressing said strap therebetween, said means for drawing including a fastening screw and a snap-in clip for attachment to a vehicle, said clip including an aperture for receiving said screw.

11. An assist strap for use in a vehicle comprising:
    a core of foam polymeric material having a generally circular cross-section;
    a cover for said core, said cover comprising a tubular flexible material covering said core and together with said core having sufficient strength to provide the sole support for a strap defined by said core and cover; and
    means for attaching opposite ends of said strap to a vehicle, said means including a pair of plates mounted on opposite sides of an end of said strap and including a fastener for drawing said plates together for compressing said strap therebetween, said means for attaching further including a clip located proximate one of said pair of plates, said fastener engaging and retaining said clip to said end of said strap, said clip including a resilient protruding end adapted to resiliently engage an opening in the vehicle to retain said assist strap to the vehicle.

12. An assist strap as defined in claim 11 and further including a backing plate extending between opposite ends of said strap, and backing plate being adapted to lie under a panel of the vehicle, said backing plate being adapted to engage said means for attaching opposite ends of said strap and to maintain said opposite ends in a spaced apart condition.

13. An assist strap as defined in claim 11 wherein said cover is made of a woven fabric.

14. An assist strap as defined in claim 13 wherein said core is a polyethylene foam material.

15. An assist strap as defined in claim 14 wherein said woven fabric is NYLON.

16. An assist strap as defined in claim 15 wherein said woven fabric has a denier of from 600 to 1000.

17. An assist strap as defined in claim 11 wherein said fastener includes a fastening screw.

18. An assist strap for use in a vehicle comprising:
a core of foam polyethylene material having a generally circular cross-section;
a cover for said core, said cover comprising a tubular flexible woven fabric, NYLON material having a denier of from 600 to 1000 covering said core and together with said core having sufficient strength to provide the sole support for the assist strap defined by said core and cover; and
clamp means for attaching opposite ends of said strap to a vehicle, said clamp means including a pair of plates mounted on opposite sides of an end of said strap and including a fastener for drawing said plates together for compressing said strap therebetween, said clamp means further including a snap-in clip positioned proximate one of said pair of plates, said fastener also engaging and retaining said snap-in clip to said end of said strap in a predetermined location prior to installation of said assist strap to the vehicle.

19. An assist strap as defined in claim 18 wherein said fastener includes a fastening screw.

20. An assist strap for use in a vehicle comprising:
a core of foam polyethylene material having a generally circular cross section;
a cover for said core, said cover comprising a tubular flexible woven fabric, NYLON material having a denier of from 600 to 1000 covering said core and together with said core having sufficient strength to provide the sole support for the assist strap defined by said core and cover; and
clamp means for attaching opposite ends of said strap to a vehicle, said clamp means including a pair of plates mounted on opposite sides of an end of said strap and including means for drawing said plates together for compressing said strap therebetween, said drawing means including a fastening screw and further including a snap-in clip for attachment to a vehicle, said clip including an aperture for receiving said screw.

21. An assist strap for a vehicle comprising:
a strap including a tubular sleeve of woven fabric and a foam core material located within said tubular sleeve of woven fabric, said foam core material being held in a compressed condition by said tubular sleeve;
a pair of matingly engageable plates for compressively clamping at least one of the opposite ends of said strap to retain same; and
a fastener engaging said pair of plates and extending from said strap for attaching said opposite ends to a vehicle.

22. An assist strap as defined in claim 21 wherein said core material is oval in cross-section and is made of a high density polyethylene foam.

23. An assist strap as defined in claim 22 wherein said woven fabric is NYLON.

24. An assist strap for use in a vehicle comprising:
a core of foam polymeric material having a generally circular cross-section;
a cover for said core, said cover comprising a tubular flexible material covering said core and together with said core having sufficient strength to provide the sole support for a strap defined by said core and cover; and
means for attaching opposite ends of said strap to a vehicle, said means including a pair of plates mounted on opposite sides of an end of said strap and including means for drawing said plates together for compressing said strap therebetween, said drawing means including a snap-in clip for attachment to a vehicle.

* * * * *

UNITED STATES PATENT AND TRADEMARK OFFICE
CERTIFICATE OF CORRECTION

PATENT NO. : 5,285,551
DATED : Feb. 15, 1994
INVENTOR(S) : Walter M. Weiland et al It is certified that error appears in the above-indentified patent and that said Letters Patent is hereby corrected as shown below:

Column 2, line 26
"out from" should be --cut from--;

Column 5, line 11, Claim 12
"and backing" should be --said backing--;

Signed and Sealed this

Fifth Day of July, 1994

Attest:

BRUCE LEHMAN

*Attesting Officer*   *Commissioner of Patents and Trademarks*